United States Patent
Hernandez-Abrego et al.

(10) Patent No.: US 9,250,703 B2
(45) Date of Patent: Feb. 2, 2016

(54) INTERFACE WITH GAZE DETECTION AND VOICE INPUT

(75) Inventors: Gustavo A. Hernandez-Abrego, Mountain View, CA (US); Steven Osman, San Francisco, CA (US); Anton Mikhailov, Campbell, CA (US); Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/110,817

(22) Filed: May 18, 2011

(65) Prior Publication Data

US 2012/0295708 A1  Nov. 22, 2012

(51) Int. Cl.
*G06F 3/048* (2013.01)
*G06F 3/01* (2006.01)
*A63F 13/40* (2014.01)
*G10L 15/26* (2006.01)
*B60K 37/06* (2006.01)
*G06F 3/16* (2006.01)
*H04M 3/56* (2006.01)

(52) U.S. Cl.
CPC .............. *G06F 3/013* (2013.01); *A63F 13/10* (2013.01); *B60K 37/06* (2013.01); *G10L 15/26* (2013.01); *A63F 2300/1081* (2013.01); *A63F 2300/1087* (2013.01); *A63F 2300/308* (2013.01); *A63F 2300/6045* (2013.01); *A63F 2300/695* (2013.01); *B60K 2350/1044* (2013.01); *B60K 2350/1052* (2013.01); *G06F 3/167* (2013.01); *G06F 2203/0381* (2013.01); *H04M 3/567* (2013.01)

(58) Field of Classification Search
CPC ................. G06F 3/033; G06F 3/048
USPC ........................................... 715/863
See application file for complete search history.

(56) References Cited

U.S. PATENT DOCUMENTS 5,588,139 A  12/1996  Lanier et al.
5,950,202 A  9/1999  Durward et al.
(Continued)

FOREIGN PATENT DOCUMENTS

CN  101185080 A  5/2008
CN  101208723 A  6/2008
(Continued)

OTHER PUBLICATIONS

R. Alex Colburn et al. "The role of Eye Gaze in Avatar Mediated Conversational Interfaces" Microsoft Research, TechReport, MSR-TR-2000-81, Jul. 2000.*
(Continued)

*Primary Examiner* — Jennifer To
*Assistant Examiner* — Xuyang Xia
(74) *Attorney, Agent, or Firm* — Martine Penilla Group, LLP

(57) ABSTRACT

Methods, computer programs, and systems for interfacing a user with a computer program, utilizing gaze detection and voice recognition, are provided. One method includes an operation for determining if a gaze of a user is directed towards a target associated with the computer program. The computer program is set to operate in a first state when the gaze is determined to be on the target, and set to operate in a second state when the gaze is determined to be away from the target. When operating in the first state, the computer program processes voice commands from the user, and, when operating in the second state, the computer program omits processing of voice commands.

19 Claims, 9 Drawing Sheets

(56) References Cited

U.S. PATENT DOCUMENTS

| | | | |
|---|---|---|---|
| 6,056,640 A | 5/2000 | Schaaij | |
| 6,152,563 A | 11/2000 | Hutchinson et al. | |
| 6,204,828 B1 | 3/2001 | Amir et al. | |
| 6,281,877 B1 | 8/2001 | Fisher et al. | |
| 6,282,553 B1 | 8/2001 | Flickner et al. | |
| 6,345,111 B1* | 2/2002 | Yamaguchi et al. | 382/118 |
| 6,522,312 B2 | 2/2003 | Ohshima et al. | |
| 6,657,628 B1* | 12/2003 | Cook | 345/473 |
| 6,859,144 B2 | 2/2005 | Newman et al. | |
| 6,943,754 B2 | 9/2005 | Aughey et al. | |
| 6,972,734 B1 | 12/2005 | Ohshima et al. | |
| 7,094,153 B2 | 8/2006 | Kunieda et al. | |
| 7,149,691 B2 | 12/2006 | Balan et al. | |
| 7,272,461 B2 | 9/2007 | Yoshikawa et al. | |
| 7,352,359 B2 | 4/2008 | Zalewski et al. | |
| 7,427,996 B2 | 9/2008 | Yonezawa et al. | |
| 7,627,139 B2* | 12/2009 | Marks et al. | 382/103 |
| 7,671,916 B2 | 3/2010 | Hashimoto | |
| 7,714,895 B2 | 5/2010 | Pretlove et al. | |
| 7,843,429 B2 | 11/2010 | Pryor | |
| 7,928,977 B2 | 4/2011 | Tanimura et al. | |
| 8,253,649 B2 | 8/2012 | Imai et al. | |
| 8,323,106 B2 | 12/2012 | Zalewski | |
| 8,537,113 B2 | 9/2013 | Weising et al. | |
| 8,957,847 B1* | 2/2015 | Karakotsios et al. | 345/156 |
| 2002/0039073 A1 | 4/2002 | Ben Ari et al. | |
| 2002/0128063 A1 | 9/2002 | Kunieda et al. | |
| 2003/0062675 A1 | 4/2003 | Noro et al. | |
| 2003/0156144 A1 | 8/2003 | Morit | |
| 2004/0061831 A1 | 4/2004 | Aughey et al. | |
| 2005/0270368 A1 | 12/2005 | Hashimoto | |
| 2006/0033713 A1 | 2/2006 | Pryor | |
| 2006/0066567 A1 | 3/2006 | Scharenbroch et al. | |
| 2006/0105838 A1 | 5/2006 | Mullen | |
| 2006/0112334 A1 | 5/2006 | Endrikhovski et al. | |
| 2006/0192775 A1* | 8/2006 | Nicholson et al. | 345/211 |
| 2006/0223635 A1 | 10/2006 | Rosenberg | |
| 2006/0250498 A1 | 11/2006 | Yoshikawa et al. | |
| 2006/0253799 A1 | 11/2006 | Montroy et al. | |
| 2006/0256083 A1 | 11/2006 | Rosenberg | |
| 2006/0258420 A1 | 11/2006 | Mullen | |
| 2006/0290663 A1 | 12/2006 | Mitchell | |
| 2007/0027591 A1 | 2/2007 | Goldenberg et al. | |
| 2007/0190494 A1 | 8/2007 | Rosenberg | |
| 2007/0206017 A1* | 9/2007 | Johnson et al. | 345/473 |
| 2007/0207857 A1* | 9/2007 | Angell et al. | 463/36 |
| 2007/0265089 A1 | 11/2007 | Robarts et al. | |
| 2008/0048931 A1 | 2/2008 | Ben Ari et al. | |
| 2008/0111833 A1 | 5/2008 | Thorn et al. | |
| 2008/0122796 A1 | 5/2008 | Jobs et al. | |
| 2008/0136775 A1 | 6/2008 | Conant | |
| 2008/0165195 A1* | 7/2008 | Rosenberg | 345/473 |
| 2008/0211766 A1 | 9/2008 | Westerman et al. | |
| 2008/0228422 A1 | 9/2008 | Sato | |
| 2008/0261693 A1* | 10/2008 | Zalewski | 463/31 |
| 2009/0110245 A1 | 4/2009 | Thorn | |
| 2009/0128552 A1 | 5/2009 | Fujiki et al. | |
| 2009/0146953 A1 | 6/2009 | Lou et al. | |
| 2009/0189974 A1 | 7/2009 | Deering | |
| 2009/0221374 A1 | 9/2009 | Yen et al. | |
| 2009/0244097 A1 | 10/2009 | Estevez | |
| 2009/0262074 A1 | 10/2009 | Nasiri et al. | |
| 2009/0282102 A1 | 11/2009 | Geurts et al. | |
| 2009/0289895 A1* | 11/2009 | Nakada et al. | 345/157 |
| 2009/0303204 A1 | 12/2009 | Nasiri et al. | |
| 2009/0315869 A1 | 12/2009 | Sugihara et al. | |
| 2010/0007582 A1 | 1/2010 | Zalewski | |
| 2010/0020102 A1 | 1/2010 | Vaananen et al. | |
| 2010/0053151 A1 | 3/2010 | Marti et al. | |
| 2010/0121501 A1 | 5/2010 | Neugebauer et al. | |
| 2010/0144439 A1* | 6/2010 | Watanabe et al. | 463/40 |
| 2010/0156781 A1* | 6/2010 | Fahn | 345/156 |
| 2010/0165093 A1 | 7/2010 | Sugio et al. | |
| 2010/0287485 A1 | 11/2010 | Bertolami et al. | |
| 2010/0315413 A1 | 12/2010 | Izadi et al. | |
| 2011/0004481 A1* | 1/2011 | Jones | G06F 3/011 705/1.1 |
| 2011/0022950 A1 | 1/2011 | Dallago | |
| 2011/0161890 A1* | 6/2011 | Anderson et al. | 715/863 |
| 2011/0175932 A1 | 7/2011 | Yu et al. | |
| 2011/0195763 A1 | 8/2011 | Kang et al. | |
| 2011/0211056 A1 | 9/2011 | Publicover et al. | |
| 2011/0298829 A1 | 12/2011 | Stafford et al. | |
| 2011/0320978 A1 | 12/2011 | Horodezky et al. | |
| 2012/0029302 A1 | 2/2012 | Hsu et al. | |
| 2012/0188148 A1 | 7/2012 | DeJong | |
| 2012/0236143 A1 | 9/2012 | Weatherhead | |
| 2012/0314060 A1 | 12/2012 | Hubenthal et al. | |

FOREIGN PATENT DOCUMENTS

| | | |
|---|---|---|
| DE | 10 2005 03535 | 8/2006 |
| DE | 10 2005 03535 A1 | 8/2006 |
| DE | 102005003535 A1 | 8/2006 |
| DE | 102009034069 A1 | 5/2010 |
| EP | 0718823 A2 | 6/1996 |
| GB | 2440348 A | 1/2008 |
| TW | 200630865 A | 9/2006 |
| WO | 2004012141 A3 | 5/2004 |
| WO | 2008103988 A3 | 10/2008 |

OTHER PUBLICATIONS

Adam Frucci, "Modded Nintendo Lets You Play Mario with Your Eyes Poorly" Aug. 3, 2010, Gizmodo, http://gizmodo.com/5603753/modded-nintendo-lets-you-play-mario-....

Alice Oh, et al., "Evaluating Look-to-Talk: A Gaze-Aware Interface in a Collaborative Environment", CHI '02 Extended Abstracts on Human Factors in Computing System, CHI 2002, Jan. 1, 2002, p. 650.

Renaud Blanch et al., "Semantic Pointing: Improving Target Acquisition With Control-Display Ratio Adaption", CHI 2004: [CHI Conference Proceedings. Human Factors in Computing Systems], Vienna, Austria, Apr. 29, 2004, pp. 519-526.

Tobii and Lenovo show off prototype eye-controlled laptop, we go eyes-on; http://www.engadget.com/2011/03/01/tobii-and-lenovo-show-off-prototype-eye-controlled-laptop-we-go/.

Stafford et al.; U.S. Appl. No. 13/045,414; Title "Selecting View Orientation in Portable Device via Image Analysis"; filed Mar. 10, 2011.

Senju et al.; "Is anyone looking at me? Direct gaze detection in children with and without autism"; Brain and Cognition 67 (2008) 127-139, Jan. 28, 2008.

Perez et al.; "A Precise Eye-Gaze Detection and Tracking System"; WSCG '2003, Feb. 3-7, 2003 Plezn, Czech Republic.

Magee et al.; "EyeKeys: A Real-time Vision Interface Based on Gaze Detection form a Low-grade Video Camera"; Computer Science Department, Boston University, Boston MA, Jun. 2, 2004.

Kaminski et al.; "Head Orientation and Gaze Detection From a Single Image"; 2006.

Guestrin et al.; "General Theory of Remote Gaze Estimation Using the Pupil Center and Corneal Reflections"; IEEE Transactions on Biomedical Engineering, vol. 53, No. 6, Jun. 2006.

PCT International Search Report and Written Opinion of the ISA/EP issued in the International Application No. PCT/US2012/0322613, European Property Office, Oct. 31, 2013.

Deodhar et al.; "Eye Catchers: A System for Eye Gaze Detection Using the TI C6416 DSP"; Advanced DSP Laboratory, May 7, 2010.

* cited by examiner

INTERFACE WITH GAZE DETECTION AND VOICE INPUT

CROSS REFERENCE TO RELATED APPLICATIONS

This application is related to U.S. patent application Ser. No. 12/947,290, filed Nov. 16, 2010, and entitled "Maintaining Multiple Views on a Shared Stable Virtual Space"; U.S. patent application Ser. No. 13/045,414, filed Mar. 10, 2011, and entitled "Selecting View Orientation in Portable Device via Image Analysis"; U.S. patent application Ser. No. 11/368,766, filed Mar. 6, 2006, and entitled "System and Method for Detecting User Attention"; U.S. patent application Ser. No. 13/115,927, filed May 25, 2011, and entitled "Eye Gaze To Alter Device Behavior"; and U.S. patent application Ser. No. 13/092,115, filed Apr. 21, 2011, and entitled "Gaze-Assisted Computer Interface", all of which are incorporated herein by reference.

BACKGROUND

1. Field of the Invention

The present invention relates to methods for interfacing a user with a computer program, and more particularly, methods, computer programs, and systems for controlling interfacing reactions by a graphical character rendered on a display.

2. Description of the Related Art

In spite of the advances in the technology of voice activity detection and microphone array processing, the problem of accurately detecting valid voice input remains a challenge. Some solutions involve the use of a "push-to-talk" approach, i.e., the use of an alternative medium to signal the time when valid voice commands are given.

In one approach, push-to-talk is implemented by pushing a game controller button to signal the presence of voice. The benefits of the push-to-talk approach are that voice detection is based on a signal de-coupled from the voice itself, and the signal is received by the system independent of noise sources. However, in a gaming environment, this approach is awkward, inconvenient, and unsupportive of an engaging gaming experience for the player.

It is in this context that embodiments arise.

SUMMARY

Embodiments of the present invention provide methods, computer programs, and systems for interfacing a user with a computer program utilizing gaze detection and voice recognition. It should be appreciated that the present invention can be implemented in numerous ways, such as a process, an apparatus, a system, a device or a method on a computer readable medium. Several inventive embodiments of the present invention are described below.

In one embodiment, a method includes an operation for determining if a gaze of a user is directed towards a target associated with the computer program. The computer program is set to operate in a first state when the gaze is determined to be on the target, and set to operate in a second state when the gaze is determined to be away from the target. When operating in the first state, the computer program processes voice commands from the user, and, when operating in the second state, the computer program omits processing of voice commands.

In another embodiment, a method for controlling interfacing reactions by a graphical character produced by a computer program and rendered on a display is presented. In one method operation, the presence of a user in a zone, which is defined in front of an image capture device, is detected. Further, the method includes an operation for determining if the Point of Gaze (POG) of the user is on the display. The computer program is set to operate in a first state when the POG is on the display, and operate in a second state when the POG is away from the display. Operating in the first state includes interaction between the graphical character and the user, and includes processing of user voice commands by the computer program. Operating in the second state includes omission of interaction between the graphical character and the user, and includes omission of processing of user voice commands by the computer program.

In yet another embodiment, an apparatus with a visual interface for capturing user input to a computer program, executing on a computing device, includes a camera, a gaze detection module, and a voice command processing module. The camera is operable to capture images of a user situated in front of a display, and the gaze detection module is operable to determine if a gaze of a user is directed towards the display based on the captured images. Further, the computer program operates in a first state when the gaze is directed towards the display, and the computer program operates in a second state when the gaze is determined to be away from the display. The voice command processing module is operable to receive voice commands from the user. The computer program processes the voice commands from the user when operating in the first state, and the computer program omits processing of the voice commands when operating in the second state.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

Gaze detection systems are utilized to determine if one or more users are looking at a target. Voice recognition systems are utilized to enter verbal commands in a computer system. Embodiments of the invention combine camera and microphone inputs, and more specifically, gaze detection and voice recognition, to interface a user with a computer system. The combination improves the accuracy, with respect to the inputs received in isolation, by cross-referencing each mode and by utilizing the different inputs for a reliable input validation.

It will be apparent, that the present embodiments may be practiced without some or all of these specific details. In other instances, well known process operations have not been described in detail in order not to unnecessarily obscure the present embodiments.

Figure 1A:
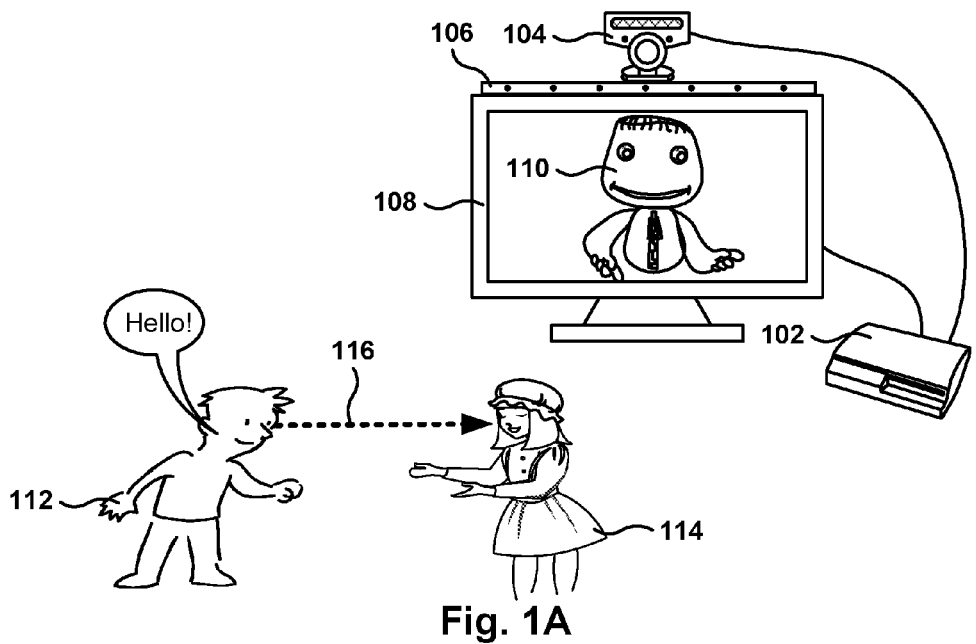
FIG. 1A shows a gaming environment that includes a user interface utilizing gaze detection and voice interaction, according to one embodiment.

FIG. 1A shows a gaming environment that includes a user interface utilizing gaze detection and voice interaction, according to one embodiment. Point-of-gaze (POG) is the point in space where a person's gaze is directed to, and has also been defined as the point in space that is imaged on the center of the highest acuity region of the retina (fovea) of each eye. POG tracking is used in human-machine interfaces to provide input to the machine regarding the focus of attention of the user. In some embodiments, knowledge of the actual POG is not required. All that is required is knowledge of whether the POG is on a target or away from the target.

Audio-visual input associated with the player is acquired with a camera and microphone combination. In one embodiment, gaze detection is used to determine the direction of the user's gaze (i.e., the POG), and to decide if the user's speech is directed to the computer program, or to decide whether the gaze is directed toward a particular region or point of the displayed scene generated by the computer program. Voice input is accepted depending on the direction of the user gaze. The direction does not have to be necessarily the direction of the camera taking images of the user, as the target can be away from the camera. The system determines whether the user's gaze is on target or not. In the embodiment of FIG. 1A, gaze 116 of user 112 is being tracked by the gaze detection system executing in game console 102. Camera 104, which provides images for the gaze detection system, tracks a zone in front of the display where user 112 is expected to stand. Camera 104 can be attached as a peripheral, can be part of the game console, or can be part of another computer device.

A microphone array 106 provides sound input for the voice recognition system, also executing in game console 102. The microphone array can be integrated within camera 104 or be a stand-alone device. In this embodiment, the system sets the display 108 as the target for the gaze detection system, i.e., the gaze detection system detects if the user's gaze is directed towards the display or not. In one embodiment, a calibration procedure is used to estimate the position of the display in relation to the camera, as described in more detail below. The system determines that user 112 is not looking at the display (the user is looking at user 114), and the system enters into a mode of operation, also referred to as state, where voice commands are not processed because the user is not paying attention to the game rendered on the display. In this embodiment, the system creates the illusion that graphical character 110 is not "interacting" with the user at this time by acting in a disinterested manner (e.g., the graphical character looks away from the user, or acts in a passive way showing lack of enthusiasm or awareness of the user).

Voice control is enabled when the user is looking at the character on the screen, as described in more detail with reference to FIG. 1B. In another embodiment, voice control is enabled when the user is looking at the eyes of the character. By adding gaze detection to speech recognition, the robustness of speech recognition is improved because gaze detection in this case will simulate a push-to-talk button providing a clear starting point in the voice input from which to start the recognition process, a condition that improves the speech recognition performance in challenging environments.

In one embodiment, the activation or deactivation of voice control is not performed until a predetermined amount of time has elapsed while the user continuously looks at the character, or looks away from the character. For example, voice control may not be enabled until the user has looked for two seconds at the character, although other thresholds of time are also possible. This threshold time enables the filtering of undesired activations of voice control due to random eye movements or due to sporadic false positives in the gaze detection algorithm. In another example, voice control is maintained for 5 seconds after the user looks away from the character, although other periods of time are also possible. This enables the user to give a command as her attention (and gaze) turns to some other area of the display related to a different game activity. In yet another embodiment, voice control is always maintained for a minimum threshold of time (e.g., 3-10 seconds although other values are also possible). Thus, if the user establishes "eye contact" and knows that the character is listening, the user may then become engaged in another action in the game (e.g., search for enemies in a battlefield), and the user knows that voice commands are still enabled while engaging in a game activity that does not require to be looking at the character (e.g., "go to castle door").

It is noted that the embodiments illustrated in FIG. 1A for voice control activation are exemplary. Other embodiments may utilize different conditions for switching voice control on and off. For example, in one embodiment voice control is only turned on or off when the user looks at the character. Thus, if the user looks at the character for one second, voice control is turned on. Afterwards, the user may look away from the character and the voice command input would still be active. When the user looks back to the character then voice control is turned off. In one example, voice control activation is based on the gaze being directed toward a button instead of toward a character. The button may be situated in a predefined region of the screen that allows the user to play the game and activate voice control upon demand. The button may change color or blink while voice detection is active. Thus, the user looks at the button to turn on or off voice control, giving the appearance that the user has pressed the button by looking at the button. The embodiments illustrated in FIG. 1A should therefore not be interpreted to be exclusive or limiting, but rather exemplary or illustrative.

In another embodiment, blinking of the eye is used in combination with POG detection to determine the activation or deactivation of voice input. For example, if the user looks at certain area of the screen (e.g., a square) and closes her eyes for 1 second, then voice input is activated.

Although a single microphone can be utilized with embodiments of the invention, a microphone array enhances the sensitivity of the system and may be used to filter incoming sound to focus on the area where the user is situated. In another embodiment, the combination of camera and microphone includes separate sources of natural or infrared light. The light reflection from the cornea is utilized to detect the gaze of the user in one embodiment.

Since the camera and the display may be situated apart from each other, a calibration operation is performed, in one embodiment, to determine the location of the display. The user is asked to look at the display, while standing in one or more locations in the area of play, and the system estimates the location of the display. In another embodiment, the calibration operation may include having the user look at one or more targets in the display, to further improve the estimation of the display location and the location of game objects within the display.

It is noted that the embodiment illustrated in FIG. 1 is exemplary. Other embodiments may utilize different forms of gaze detection, different system configurations, or utilize gaze detection to perform a variety of game operations. The embodiment illustrated in FIG. 1 should therefore not be interpreted to be exclusive or limiting, but rather exemplary or illustrative.

Figure 1B:
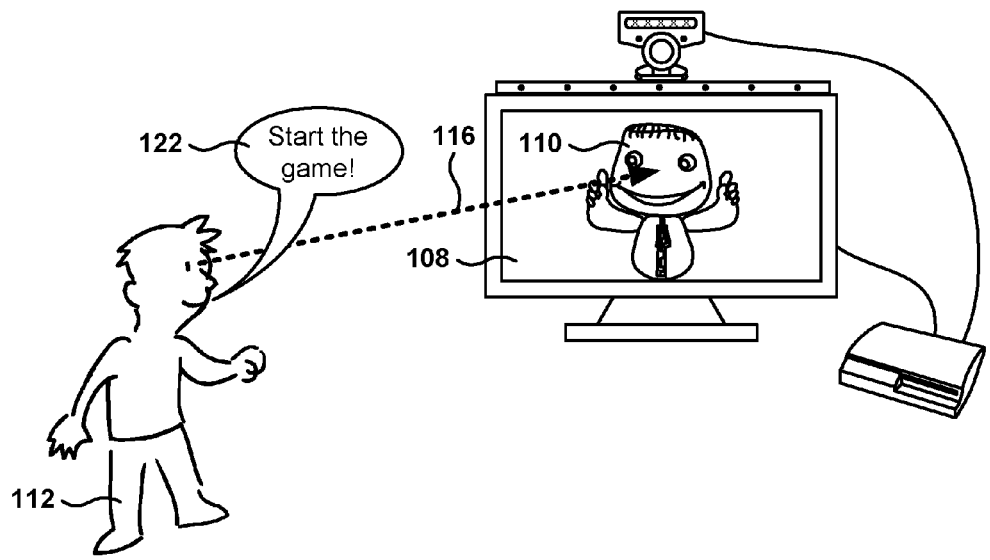
FIG. 1B shows a user interacting with a game console, according to one embodiment.

FIG. 1B shows a user interacting with a game console, according to one embodiment. Gaze detection is used as an alternate, natural way to signal the presence of voice. When the player makes "eye contact" with the character, the character turns on its "listening" mode and signals that the system is ready to receive voice commands. This is a natural way to interface in a gaming environment because it is natural for the player to issue verbal commands once the character appears to be "listening." This "game responsiveness" based on gaze detection adds another level of naturalness to game interaction.

Character 110 shows awareness of the presence of user 112 when user 112 has gaze 122 towards display 108. Awareness enables the impression of having a conversation with the character. The impression of awareness can be relied to the user in multiple ways, such as providing eye contact, showing excitement, smiling, jumping, providing verbal cues to the user, showing an object on the display, etc.

Once game character 110 is engaged with the user, verbal commands are processed by the system, but the processing of verbal commands is omitted when the user is not looking at the character or display. Thus, when user 112 gives a verbal command (e.g., "open the door"), the speech recognition program processes the user's verbal input, and the game reacts by executing the voice command. Speech recognition is enhanced with gaze detection, because the number of false positives (i.e., verbal outputs not intended as a command) is reduced or eliminated, and because gaze detection simulates a push-to-talk approach that provides the voice input activation from which to start the recognition process, as described above.

Figure 2A:
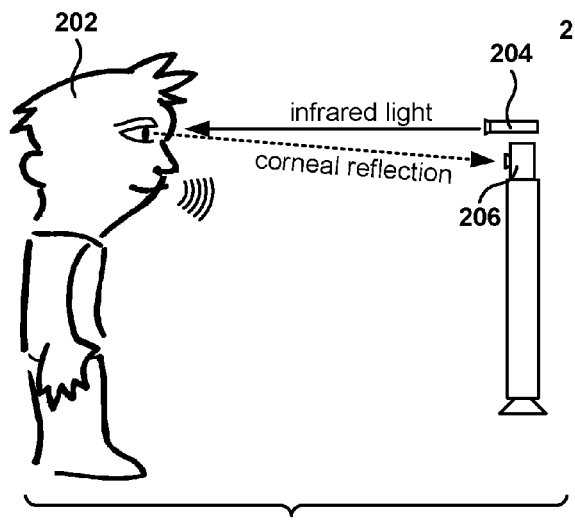
FIGS. 2A-2C illustrate different embodiments for Point of Gaze (POG) detection.
Figure 2B:
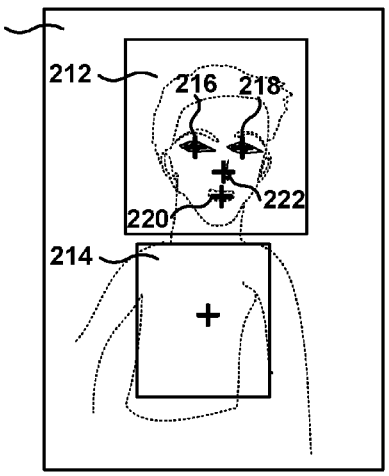
Figure 2C:
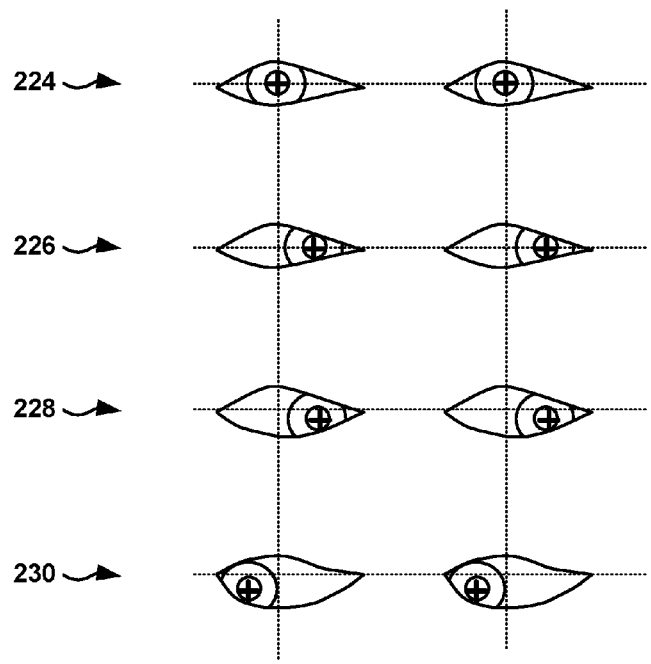

FIGS. 2A-2C illustrate different embodiments for Point of Gaze (POG) detection. In one embodiment, gaze detection is performed by analyzing the corneal reflection of light directed towards the user. As shown in FIG. 2A, infrared light source 204 emits infrared light, and the reflection of the infrared light, from the cornea of user 202, is captured by infrared camera 206. The reflection is then analyzed to determine the POG of user 202. Infrared light source 204 may also be embedded within camera 204. In another embodiment, light in the visible spectrum is used instead of infrared light, and a combination of visible light and infrared light is also possible.

The perspective projection of the iris-sclera boundary (limbus) is used to estimate the position and orientation of the eye in space, in order to calculate the POG. The POG estimation determines the position of the centers of the pupil and one or more corneal reflections. The corneal reflections are virtual images of light sources (e.g., infrared) that illuminate the eye and are created by the front surface of the cornea, which acts as a convex mirror. More details about gaze detection using corneal reflections can be found in "General theory of remote gaze estimation using the pupil center and corneal reflections" IEEE Transactions on Biomedical Engineering, 2006, by E. Guestrin and M. Eizenman, which is incorporated herein by reference.

In another embodiment, gaze detection is determined utilizing image analysis of video images 212 of play area 210, including the detection and tracking of user features such as eyes, face, nose 222, mouth 220, torso 214, etc. In the embodiment of FIG. 2B, facial features are tracked to estimate the three dimensional location of the head and to derive the positions of the center of rotation of the eyes. The more features tracked, the more reliable gaze detection will be. For example, if a user turns her head away from the camera, only one eye will be visible to the camera. By understanding the position of the nose and mouth, the system determines that the user has turned the head, instead of assuming a failure in detecting the eye. Once the positions of the user features are determined, the POG is calculated.

FIG. 2C illustrates the tracking of eye features. Eyes 224 have the pupil and the iris situated in approximately the center of the cornea, which indicates that the user is looking straight ahead. Eyes 226 show the pupil situated on the right side of the cornea (which corresponds to the user's left side), which indicates that the user is looking to her left. Eyes 228 show the pupil situated below the horizontal central line of the cornea and on the right side of the cornea, which indicates that the user is looking down towards the user's left. Eyes 230 show the pupil below the horizontal central line of the cornea and on the left side of the cornea, which indicates that the user is looking down and towards her right.

The gaze recognition system may also track the distance between the eyes. For example, if the distance between the eyes becomes smaller, the system detects that the user is turning the head. By analyzing the position of the iris or pupil within the cornea, as well as the location of the cornea and the distance between the eyes, the gaze recognition system estimates the POG of the user.

In addition, the analysis may be performed based on certain images, whether consecutive frames or only certain ones or subsets of frames from the video stream to follow the movement of the user, and in particular, the movement of the face and the eyes. In one embodiment, it is assumed that the position of the eyes does not change drastically from frame to frame of the video stream, and the gaze detection system uses the information from previous frames to perform a detailed analysis in the area where the eyes are expected to be situated.

Tracking gaze in a gaming environment is more challenging than tracking gaze in other situations where the features of the player are easily located, such as for example a helmet with gaze detection or a lab environment where the user is situated in a predefined space. In gaming, the user is free to move within a play area, which has a typical size of several steps wide by several steps long, although bigger sizes are also possible. Additionally, the user moves in a dynamic manner, and at any time, i.e., the user may move his head, turn the head, move limbs (arms, legs, hands), jump, squat, turn, perform game related movements (e.g., a ball-throwing motion in a sports game, hand motions to simulate aiming a virtual gun, etc.), etc. Gaze detection, as defined herein, takes into account these possible scenarios, and, in one embodiment, gaze detection utilizes information obtained from methods that track a user's physical features.

In one embodiment, tracking the user involves several algorithms that may be used simultaneously, or intermittently, according to the position of the user, the history of user motions, the game state, the number of players, information available from a controller whose location is being tracked, etc., or any combination thereof. This information can also be blended based on a combination of factors, such as tracking data and the state or type of interfacing being performed. In one embodiment, the tracking algorithms may include tracking the location of the player within the play area, the depth within the play area of the user's face (i.e., the distance from the face to the camera), the location of the user's face, the user's mouth, the user's eyes, the user's nose, the orientation of the user's face, the location of the torso, the location of the arms, the history of user motion (to predict where the user's features are expected in the future), etc., or any combination thereof. In addition, different modes of gaze detection (e.g., image analysis, corneal reflections) may be used in combination, or alternatively.

For example, a user-location tracking algorithm may determine the location of the user, and a depth tracking algorithm may estimate the distance of the user's face to the camera. With this information, a gaze detection algorithm based on image analysis will look for the eyes, or some other user feature, using the user's location and depth within the field of play. In one embodiment, the gaze detection algorithm may focus in a particular area within an image taken by the camera, where the particular area corresponds to the location of the eyes. By using location information, gaze detection is able to focus in a certain area of the image where the user is expected. In addition, gaze detection takes into account the depth of the user within the play field to estimate the size of the eyes, nose, or some other user feature. As the user moves away from the camera, the user's features and light reflections will be harder to track; gaze detection may be processed by switching from low complexity algorithms to more complex algorithms, which may require increased computing cycles to estimate the gaze of the user.

In another embodiment, gaze detection takes into account game status to adjust the gaze detection algorithm to use game information, and gaze detection will account for the location of the user or a potential action by the user. For example, if a game prompts the user with "blink for 2 seconds to put the key in the door," gaze detection will realize that the user may have his eyes closed, which will make it impossible to find the white part of the cornea. Alternatively, if the game prompts the user with "bend down to enter the cave," gaze detection will be ready to search for the head of the user in a lower location than in previous frames.

It is appreciated that the embodiments illustrated in FIG. 2C are exemplary. Other embodiments may track different user features, track all images in the video stream, or track a subset of images. The embodiments illustrated in FIG. 2C should therefore not be interpreted to be exclusive or limiting, but rather exemplary or illustrative.

Figure 3:
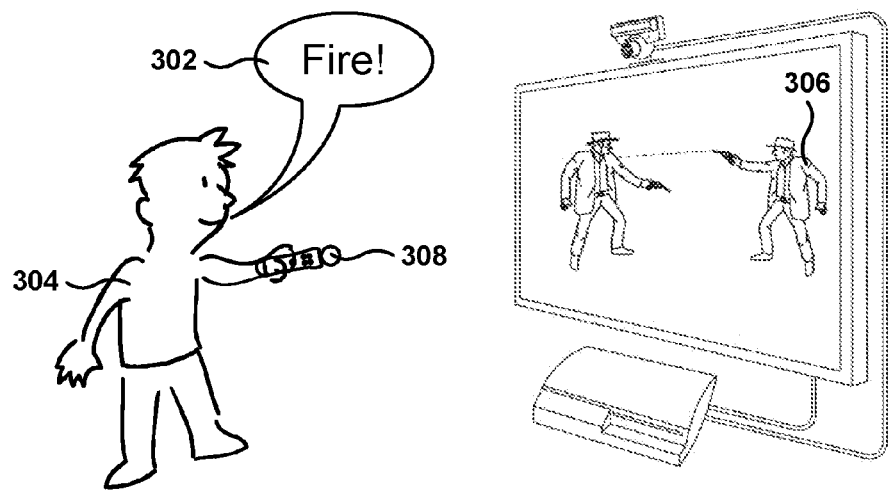
FIG. 3 shows a user giving a voice command, according to one embodiment.

FIG. 3 shows a user giving a voice command, according to one embodiment. Remote Gaze Detection is a difficult task that seldom can be used as a stand-alone user interface but that often can be used as part of a multimodal man-machine interface. A large amount of resources is required to continually track gaze, but detecting rapid changes of point of gaze may be more feasible and less resource demanding. A property of human vision is that gaze jumps from one subject to another in the scene, and gaze does not move smoothly across different points of interest unless these points move smoothly. This is because the muscles that control eye movement work in bursts, quickly changing focus between one object and another. For this reason, gaze detection is a good way to quickly select between different objects on the display based on user gaze. However, gaze detection can be a poor way to signal the direction of a movement or to interpret gaze changes as gestures.

In one embodiment, gaze tracking is activated after a voice command. In this case, user 304 gives a voice command (e.g., "fire") independent of POG. After the voice command is received, and for a period of time, gaze tracking is activated to be used as an input to the game (e.g., to define the target for the bullet or arrow that was fired toward the POG).

The use of voice commands complements gaze detection. In one embodiment, gaze is used to select a game object and voice is used to perform an action on the object selected by the gaze. Thus, gaze is used to select a point or subject on the scene rendered on the display, and voice commands cause actions to be performed related to the selected point or subject. For example, user 304 first focuses the gaze on a specific item (e.g., character being controlled 306, background in the game, an enemy, a menu selection, an object, a door, a game console, a display, a target, etc.), and then the user 304 gives a voice command 302, causing the game to perform the desired action on the selected item (e.g., move, rollover, fire, select, turn on, open, pick up, drop, etc.). By adding gaze to speech recognition, the program is able to perform a finer input selection, while providing an easier way for the user to interface with the game.

The gaze and voice combination may be used to navigate menu selections, such as the menu options offered by a game console before starting a game, starting a video, playing a song, entering a virtual world, etc. The user utilizes gaze to select from options in a menu, and utilizes voice commands to initiate the selected options, which may open another menu or perform any other system command. In one embodiment, options selected with gaze are highlighted (e.g., brightened, framed, showed blinking, bolded, enlarged, etc.) to assist the user in option selection by giving feedback to the user to what is the option currently selected with gaze. Once the user is certain of the gaze-selected option, then the user can perform a command to initiate the execution of the option.

Added flexibility may be achieved by using additional input devices, such as game controllers, touch pads, hand-gestures, etc. For example, selection could be performed with gaze and the input can be either the pressing of a button on the controller 308, or a movement of the controller. In another example, the user selects a puzzle piece with gaze, and then moves the controller around to move the puzzle piece within the display. Gaze is utilized for "fast positioning" while other input mechanisms are utilized to provide finer control.

Figure 4:
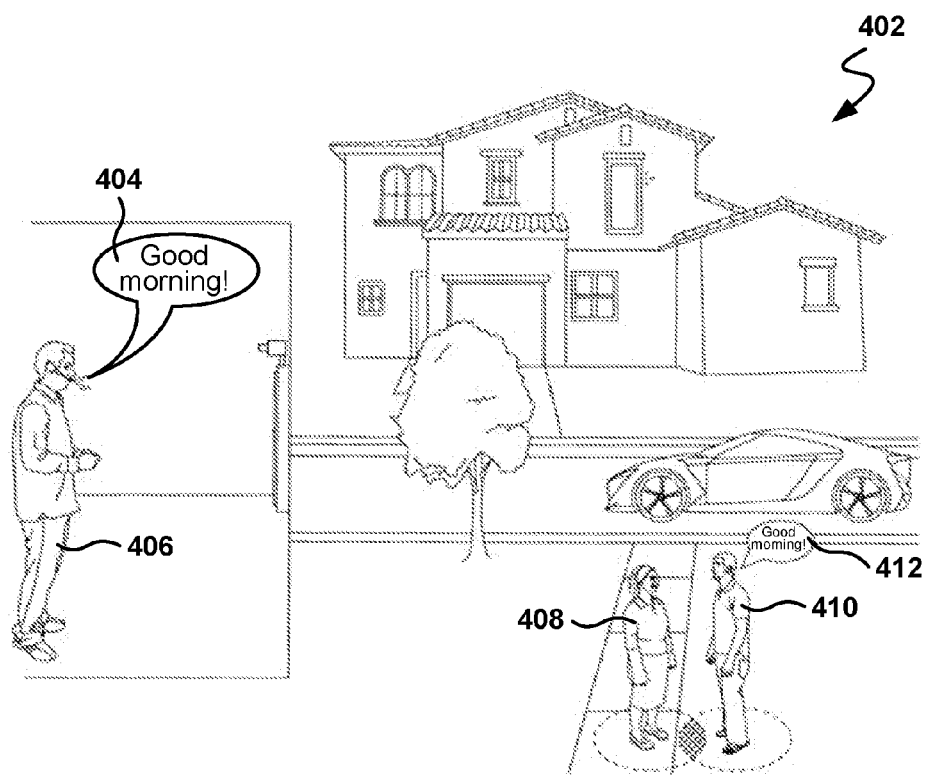
FIG. 4 illustrates an avatar speaking, where the avatar speech is based on a user's voice input, according to one embodiment.

FIG. 4 illustrates an avatar speaking, where the avatar speech is based on a user's voice input, according to one embodiment. The embodiment of FIG. 4 illustrates another combination of gaze detection with verbal inputs. User 406 plays a game that includes virtual reality 402, and avatars 408 and 410. Avatar 410 is being controlled by user 406. When user 406 directs his gaze towards avatar 408, the game moves avatar 410 near avatar 408. Once avatar 410 is situated near avatar 408, user 406 speaks 404 (e.g., "good morning"), and user's 406 speech is reproduced 412 by avatar 410.

In another embodiment, gaze detection is used in a virtual conference environment. When the gaze of the user is on the display (where the image of the other party is shown), the system reproduces speech produced by the user. However, if the user is not looking at the display (e.g., the user is talking to another person in the room not participating in the conference), the speech of the user is not reproduced.

Figure 5:
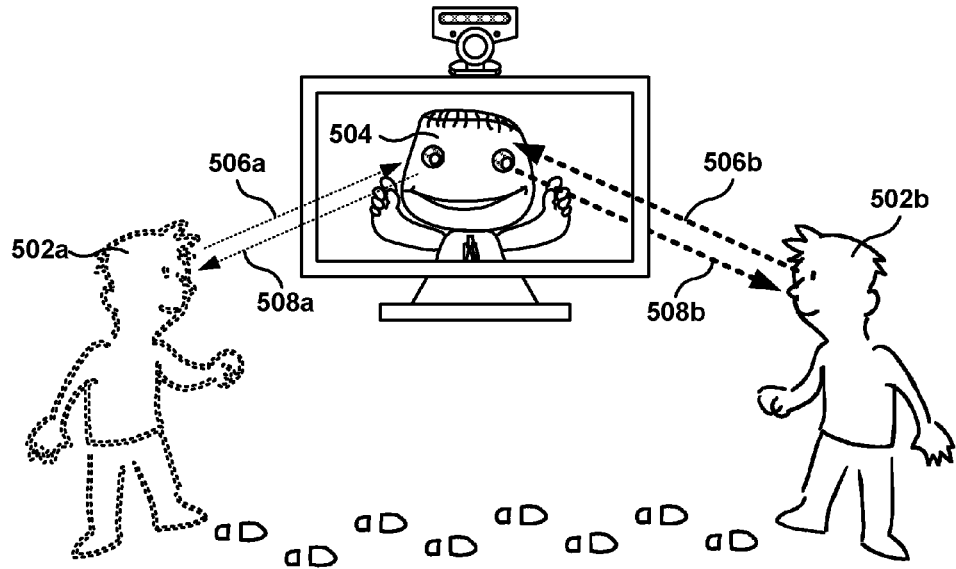
FIG. 5 illustrates a game character tracking the movement of a user, according to one embodiment.

FIG. 5 illustrates a game character tracking the movement of a user, according to one embodiment. If the user establishes "eye contact" with graphical character 504, then the graphical character "follows" the user as the user moves from position 502a to 502b. "Eye contact" is established when the user has the gaze 506a on the graphical character and the graphical character has its virtual gaze 508a on the user. When the user moves to position 502b, the "eye contact" is maintained as the gazes of user 506b and character 508b are still maintained on each other.

The user is able to enter or leave the interaction mode with the character, by looking at the character or by looking away from the character. This interaction resembles having a "conversation" with the character, in the same fashion that two people have a conversation, because two-people conversations usually have both persons looking at each other.

The combination of two different input modes, gaze detection and voice recognition, constructs an enhanced man-machine interface that provides a more engaging and natural interaction and creates a virtual "eye contact" between user and game character. The game character gains in naturalness, and the richness of the gaming experience is improved with the notion of "character awareness" when the user interacts with the character. Moreover, eye contact may be used to keep interacting with the character, even after the game environment changes. For example, if a game scene rotates but the character remains in a static position, the character rotates the head towards the direction of the gaze of the player. This awareness of player position by the character is useful when the character tracks the position of a user who might be changing position relative to the screen, but continues to look at the character. By following the user, the character shows that the character continues to interact with the user. In another example, gaze is used to select an object rendered on the display, and an action is performed on the selected object when a verbal command is received.

It should be noted that the embodiment of FIG. 5 includes the graphical character 504 being rendered in 3D (three dimensional representation), or in what is referred to as 2.5D (a graphical representation that makes the character appear on 3D). In another embodiment, when a character is presented in 2D, the character appears to be looking at the user when the character looks straight into the area in front of the display, no matter where the user is situated. Thus, as the user moves, the 2D character does not need to move his eyes. In this case, the character may turn his body, or the head, or perform other motions to indicate to the user that the character is keeping "eye contact" and remaining engaged in the virtual conversation.

Figure 6A:
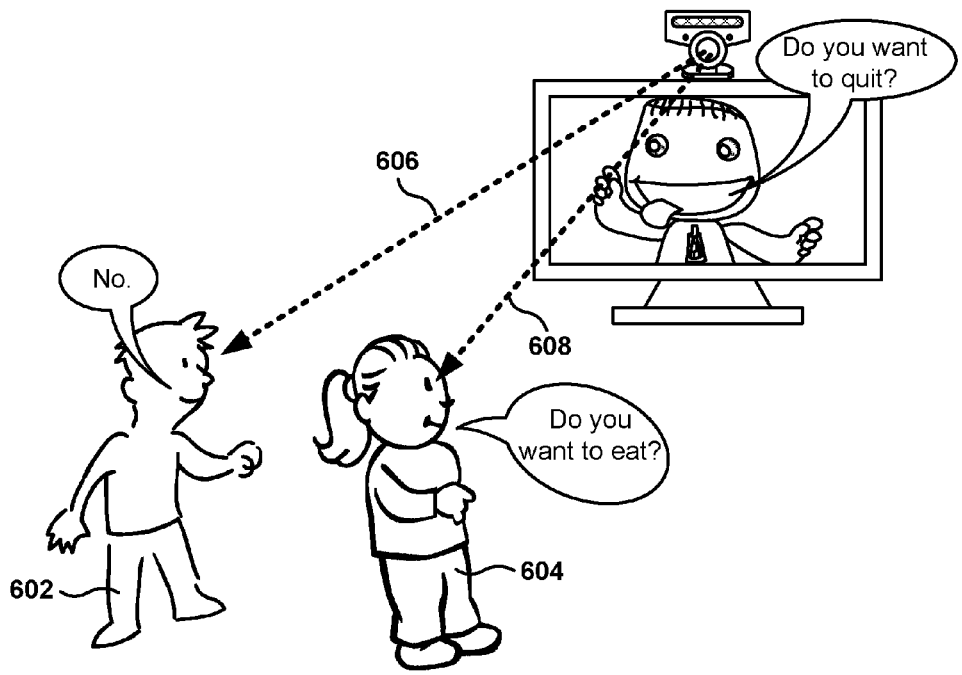
FIGS. 6A-6C illustrate several embodiments for the processing of verbal commands in the presence of multiple users.
Figure 6B:
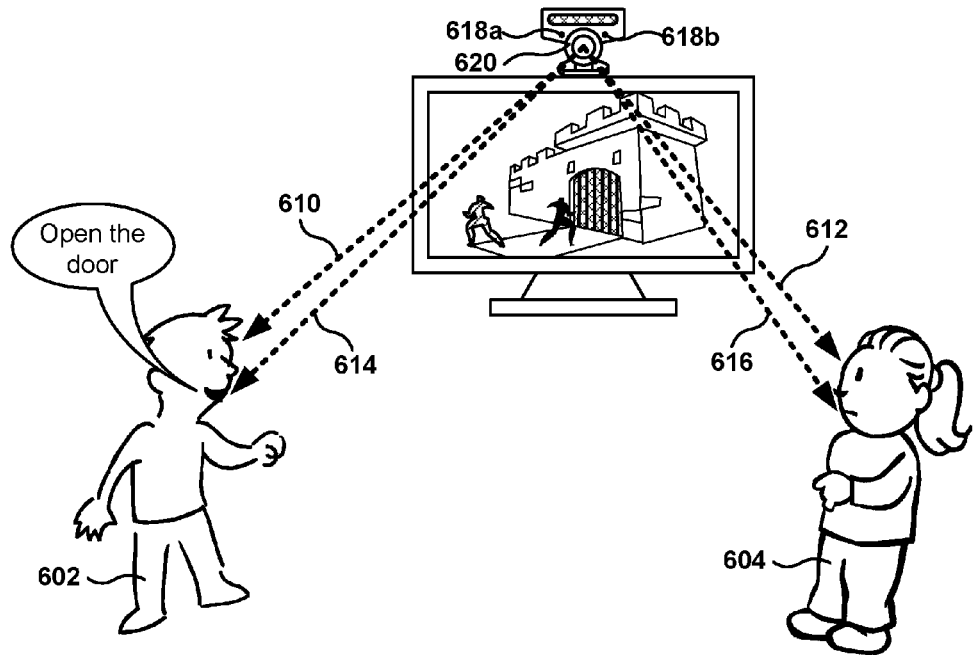
Figure 6C:
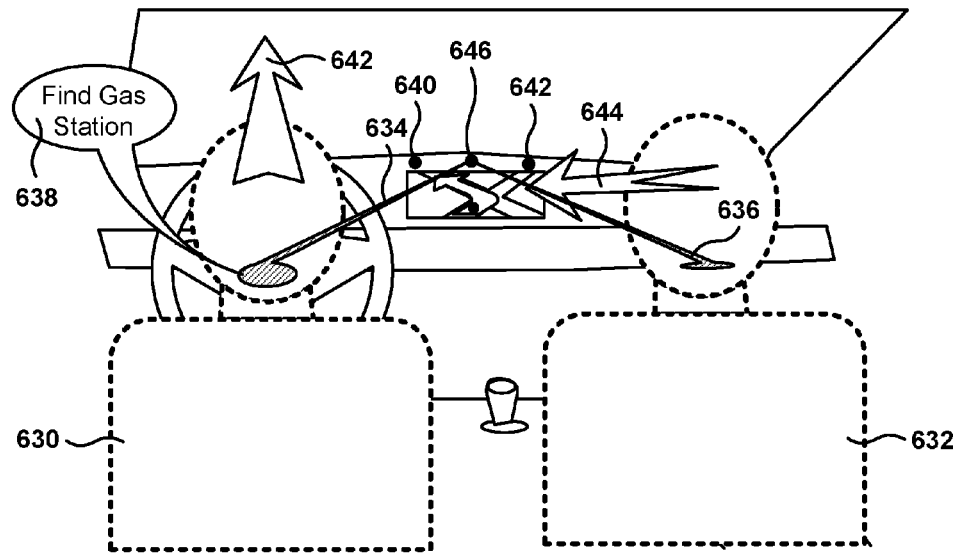

FIGS. 6A-6C illustrate several embodiments for the processing of verbal commands in the presence of multiple users. One of the problems with speech recognition is that interference signals (e.g., noise, background voices, air conditioners, traffic, etc.) affect the performance of voice recognition. When using voice recognition, any sound could be potentially misrecognized as speech. Depending on the nature of the noise, the system may interpret noise as a voice command; conversely, the system may interpret a voice command as noise. Some noises are less disruptive than others. For example, air conditioning noise can be eliminated with ease because the noise is usually in a frequency outside the spectrum of human voice. However, if there are two or more voices, filtering is more difficult.

Gaze detection assists speech recognition by alerting that there are other persons near the player, and that other voices may be a source of interference. In one embodiment, the voice recognition system changes the mode of operation when multiple users are detected, for example, by implementing algorithms that search, and reduce or eliminate interfering voices. In one embodiment, the voice recognizer loads acoustic models that better match the interfering circumstances, or the voice recognizer increases the confidence level needed to validate a speech command.

In one embodiment, two players interact with the game simultaneously, and each player is able to manipulate one or more objects present in the display. Each object is defined to respond to (i.e., be manipulated with) unique commands, and when a user enters a voice command the game determines the object associated with the voice command. The game manipulates the selected object according to the voice command. For example, a first screen object is a gun that can be manipulated with commands "fire" and "stop fire." A second screen object is a monster that can be manipulated with commands "jump" and "bite." A combination of gaze tracking and voice recognition enables the computer to determine how to control each object, knowing the user that is manipulating the object (gaze) and the voice command for the object (voice and command discrimination according to the object).

In the embodiment of FIG. 6A, user 602 is playing the game and in "eye contact" with the game character. Another user 604 is also present in the play area. The character has asked a question ("do you want to quit?), and the second user 604 has also asked a question ("do you want to eat?"). When user 602 replies, it is not clear if the user is speaking to user 604 or to the character in the game.

The gaze detection system has detected the gaze 606 of user 602 and the gaze 608 of user 604. Because of the previous interactions with the game, the game knows that the user playing is user 602. Thus, the game attempts to block the voice signal coming from the person that is not engaged in the game. When the camera detects more than one gaze, the system is aware that there may be an interfering voice.

In the presence of potential sound interference, the system changes mode of operation and voice recognition becomes more aware of the possibility of an error. Voice recognition may try to compensate for the potential loss of recognition accuracy by temporarily change the settings that balance the operational speed and the accuracy of the recognition results, or it may become stricter in the way voice commands are detected, or may require additional validations methods. For example, in FIG. 6A the character may reply asking for confirmation (e.g., "You said 'no.' Is that correct?"). In another example, the system may ask for confirmation if the voice command could be interpreted in more than one way, such as, "did you say 'call home' or 'go home'?").

In another embodiment, the game detects multiple persons in the playing area, but only one with the gaze on the display. In this case, the game focuses its attention on the person with the gaze on the display, blocking speech from people that are not looking at the display.

In one embodiment, gaze detection is used for security. For example, if the computer detects a second gaze, the user may be warned that there is more than one pair of eyes on the screen.

FIG. 6B shows an environment with two users. The system identifies which user delivers each verbal command, and processes each delivered verbal command based on the user that delivered the verbal command. For example, in FIG. 6B, user 602 is delivering a verbal command, while user 604 is silent. Both users are facing camera 620, and gaze recognition, as previously described, is utilized to determine gaze 610 of user 602 and gaze 612 of user 604.

In one embodiment, the system tracks the mouth of users, and when speech is detected, the system analyzes which user is moving the mouth to attribute the speech to the user whose mouth is moving. Tracking the mouth means determining when the mouth is open, closed, semi-closed, etc., or determining that the mouth is moving because the mouth images, captured by the camera, are changing over time. The system tracks mouth motion 614 of user 602, and mouth motion 616 of user 604. After the system receives the verbal command (e.g., "open the door"), the system determines that mouth motion 614 of user 602 indicates that user 602 was moving the mouth while the verbal command was delivered, and that the mouth motion 616 of user 604 indicates that user 604 was not moving the mouth during the verbal command. Since user 602 was moving the mouth and user 602 was not, the system attributes the verbal command to user 602. Consequently, the avatar controlled by user 602 will perform the operation associated with the verbal command received.

In another embodiment, a plurality of microphones is utilized to determine which user delivers a verbal command. In FIG. 6B, the sound captured by microphones 618a and 618b is analyzed to determine the direction of the sound arriving to the microphones. For example, if one user is situated on the left, and the other user is situated of the right (as determined via gaze detection, user-feature tracking, etc.), sound analysis is performed to determine if the sound comes from the left or the right. Once the direction is determined, the verbal command is attributed to the user that is situated in the direction where the sound came from. In the embodiment of FIG. 6B, sound analysis determines that the sound came arrived at the left speaker 618a first, and since only one user 602 is on the left, the system attributes the verbal command to user 602.

Determining the directionality of sound can be performed in a plurality of ways, such as by using directional microphones, by using microphone arrays, by analyzing the arrival times of sound to the speakers, etc., or any combination thereof. Verbal commands are attributed to the user that is situated in the direction where the sound came from. It is noted that the embodiments illustrated in FIG. 6B are exemplary. In addition, the different methods for identifying users may be combined to better determine directionality. The embodiments should therefore not be interpreted to be exclusive or limiting, but rather exemplary or illustrative.

FIG. 6C illustrates an embodiment where sound direction is used to determine when a verbal command is accepted. Driver 630 is controlling a GPS navigation system in the car, while passenger 632 is looking at the GPS navigation system. The gaze detection system using camera 646 detects that gaze 642 of driver 630 is directed towards the front of the car, on the road, and gaze 644 of passenger 632 is directed to the GPS device. If the system did not accept verbal commands from users that are not looking at the device (e.g., the GPS device), then the system would not admit commands from the driver, unless the driver looked directly at the device, which may be dangerous while driving.

The system of FIG. 6C tracks the direction of the sound, either by performing analysis of mouth movements (634 and 636), or by detecting sound direction using speakers 640 and 642, as described above with reference to FIG. 6B. The verbal command 638 (e.g., "find gas station") delivered by driver 630 is accepted by the GPS navigation system, even when the gaze 642 of driver 630 is not on the GPS device. This is useful in situations with two people present, one person trying to control the device (and that is looking away), and a second person who happens to be looking at the device. The system will not prevent the driver from issuing voice commands just because the driver is not looking at the device.

Figure 7:
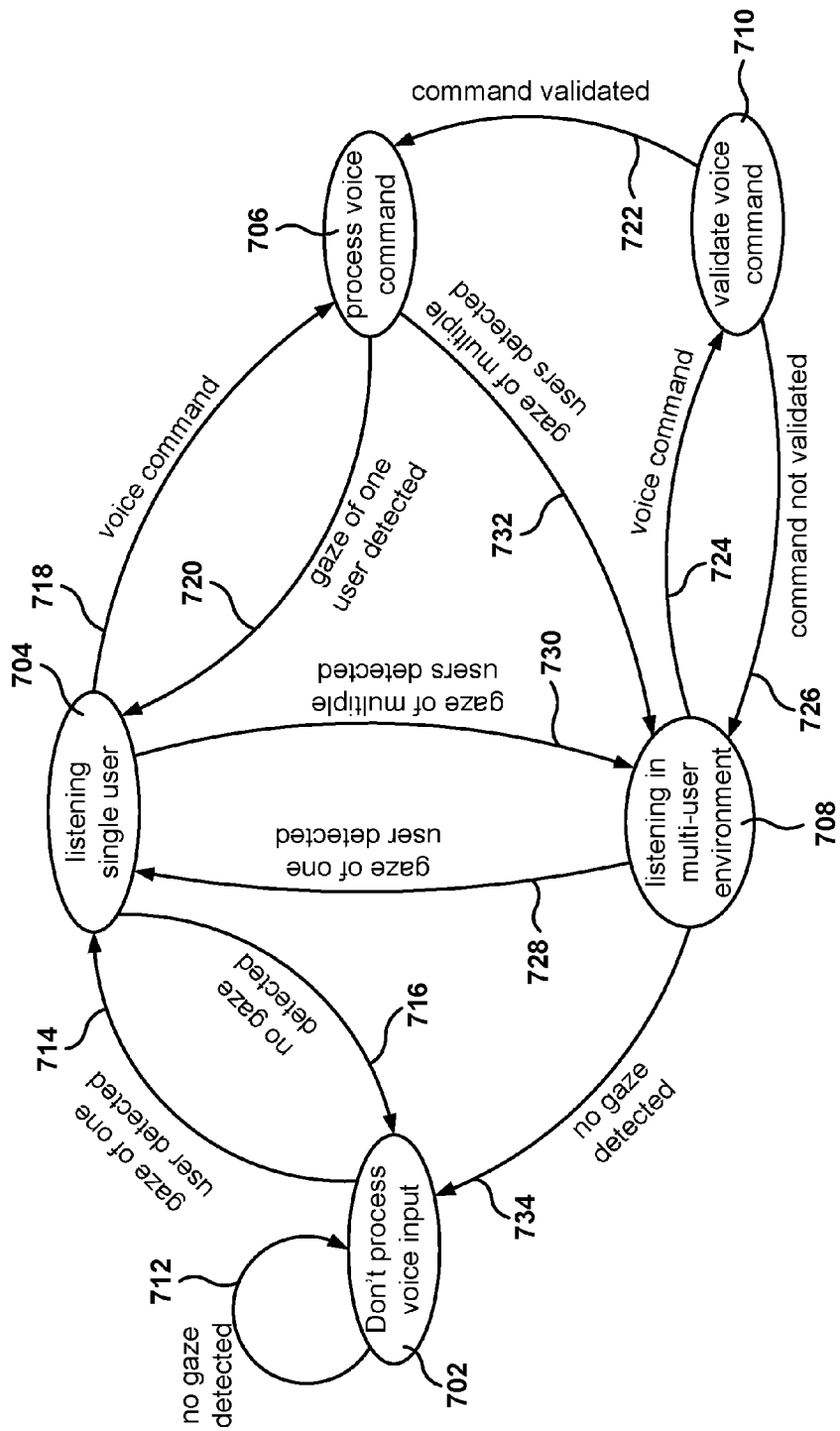
FIG. 7 shows a computer-program state diagram for interfacing, via gaze detection and voice commands, with a user, according to one embodiment.

FIG. 7 shows a computer-program state diagram for interfacing, via gaze detection and voice commands, with a user, according to one embodiment. While gaze is not detected 712, the computer program stays at state 702 where voice input is not processed. If the gaze of a user is detected 714, the program transitions to state 704, where the program "listens" to the user and starts processing voice commands. From state 704 the program may transition to several other states: if the gaze of the user is not detected 716, the program transitions back to state 702; if a voice command is received 718, the program transitions to state 706 to process the voice command; and if the gaze of multiple users is detected 730, the program transitions to state 708 to operate in a multi-user environment.

In state 706, a received voice command is processed, e.g., to perform an operation by a character in a video game. From state 706, the program may transition to one of two states after processing the voice command: if the gaze of one user is detected 720, the program transitions back to state 704; and if the gaze of multiple users is detected 732, the program transitions to state 708.

As described above, the program is in state 708 when the program has detected multiple users, and the program listens for verbal commands. From state 708, the program may transition to several states depending on the occurrence of triggering events: if no gaze is detected 734, the program transitions back to state 702 and waits for the gaze of the user; if the gaze of one user is detected 728, the program transitions to state 704 to enter single-user mode again; and if the program receives a voice command 724, the program transitions to state 710 to perform a validation of the voice command.

In state 710, the program validates the voice command that was received while in multiuser mode (708). The validation can be performed in several ways, such as asking the user for confirmation, performing an auxiliary speech recognition process different (or a different instance of the same process but with different settings or reference models) from the speech recognition process performed while in single user mode (704), showing on a display the command to be performed for a few seconds in order to give the user a chance to cancel, etc. If the voice command is validated 722, the program transitions to state 706 to process the validated voice command, and if the voice command is not validated 726, the voice command is ignored and the program transitions back to state 708.

It is noted that the embodiment illustrated in FIG. 7 is exemplary. Other embodiments may utilize different states and different transition events. The embodiment illustrated in FIG. 7 should therefore not be interpreted to be exclusive or limiting, but rather exemplary or illustrative.

Figure 8:
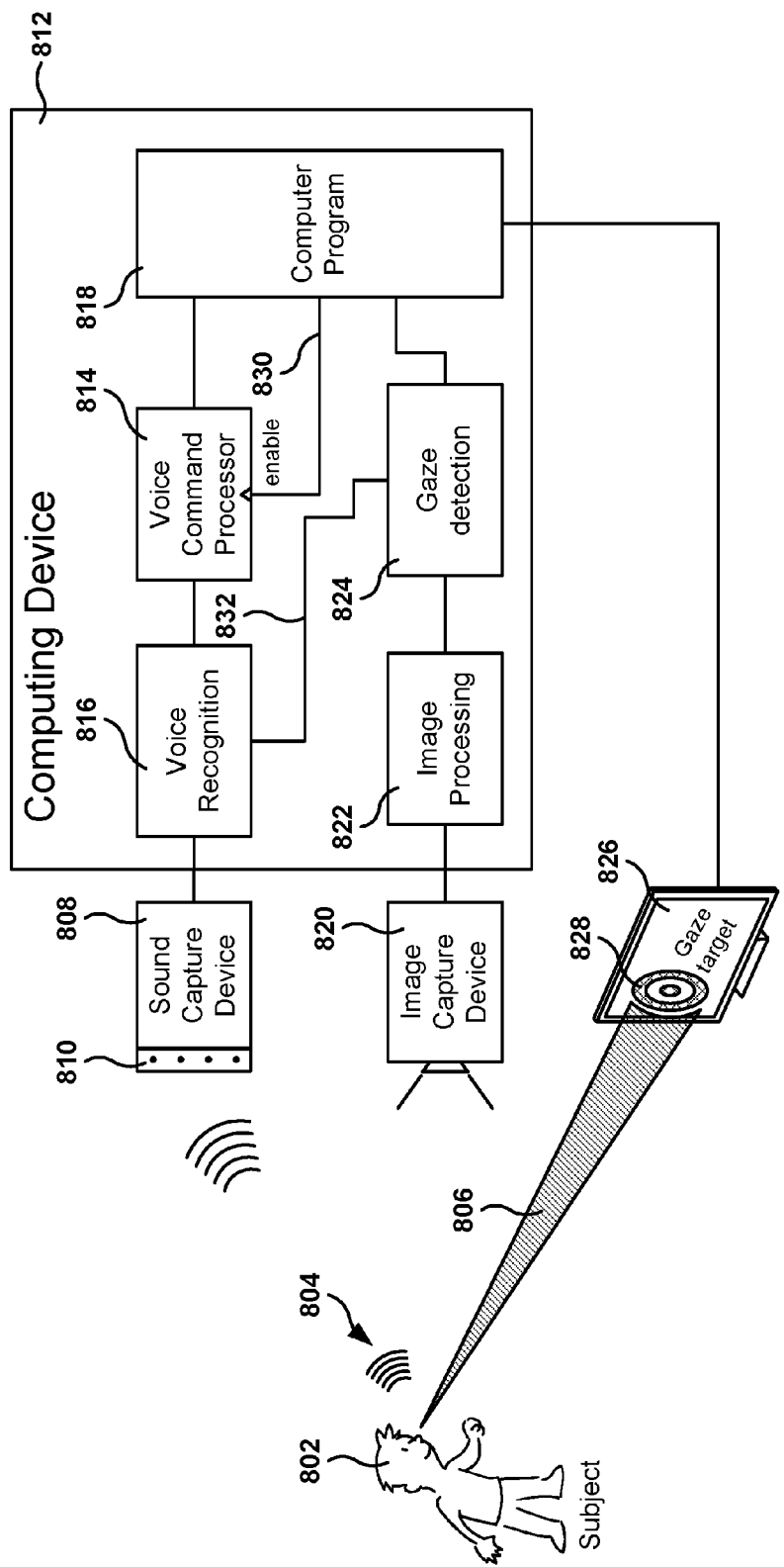
FIG. 8 shows an architecture for interfacing a user with a computing device, according to one embodiment.

FIG. 8 shows an architecture for interfacing a user with a computing device, according to one embodiment. Computing device 812 is in communication with sound capture device 808, image capture device 820, and display 826. In other embodiment, sound capture device 808, image capture device 820, and display 826 may be embedded within computing device 812, or may be combined into one or more devices, such as a video recorder. In one embodiment, the sound capture device includes a microphone (not shown), and in another embodiment, the sound capture device includes a microphone array 810.

Gaze target 828 is defined within the display, although gaze target 828 may also be set outside the display, such as for example, on computing device 812. Image processing module analyzes the images captured by image capture device 820, and gaze detection module 824 determines if the gaze 806 of user 802 is directed towards target 828. On the voice side, voice recognition module 816 performs voice recognition of the sound received from sound capture device 808, and determines if a valid verbal command has been received. Voice command processor 814 processes the input from voice recognition module 816 and outputs detected voice commands to computer program 818. In one embodiment, gaze detection 824 and voice recognition 816 exchange information 832 to improve performance. For example, gaze detection 824 may be activated only when there is continuous voice being detected, and voice recognition 816 may only be activated if the gaze remains around the head of the screen character.

Computer program 818 receives inputs from gaze detection 824 and voice command processor 814. When gaze 806 of the user 802 is not set on the target, computer program 818 disables 830 voice command processor 814, such that the voice of the user is not processed when the user does not direct gaze 806 towards gaze target 828.

It is noted that the embodiment illustrated in FIG. 8 is exemplary. Other embodiments may utilize different modules, or have several functions performed by one module, etc. The embodiment illustrated in FIG. 8 should therefore not be interpreted to be exclusive or limiting, but rather exemplary or illustrative.

Figure 9:
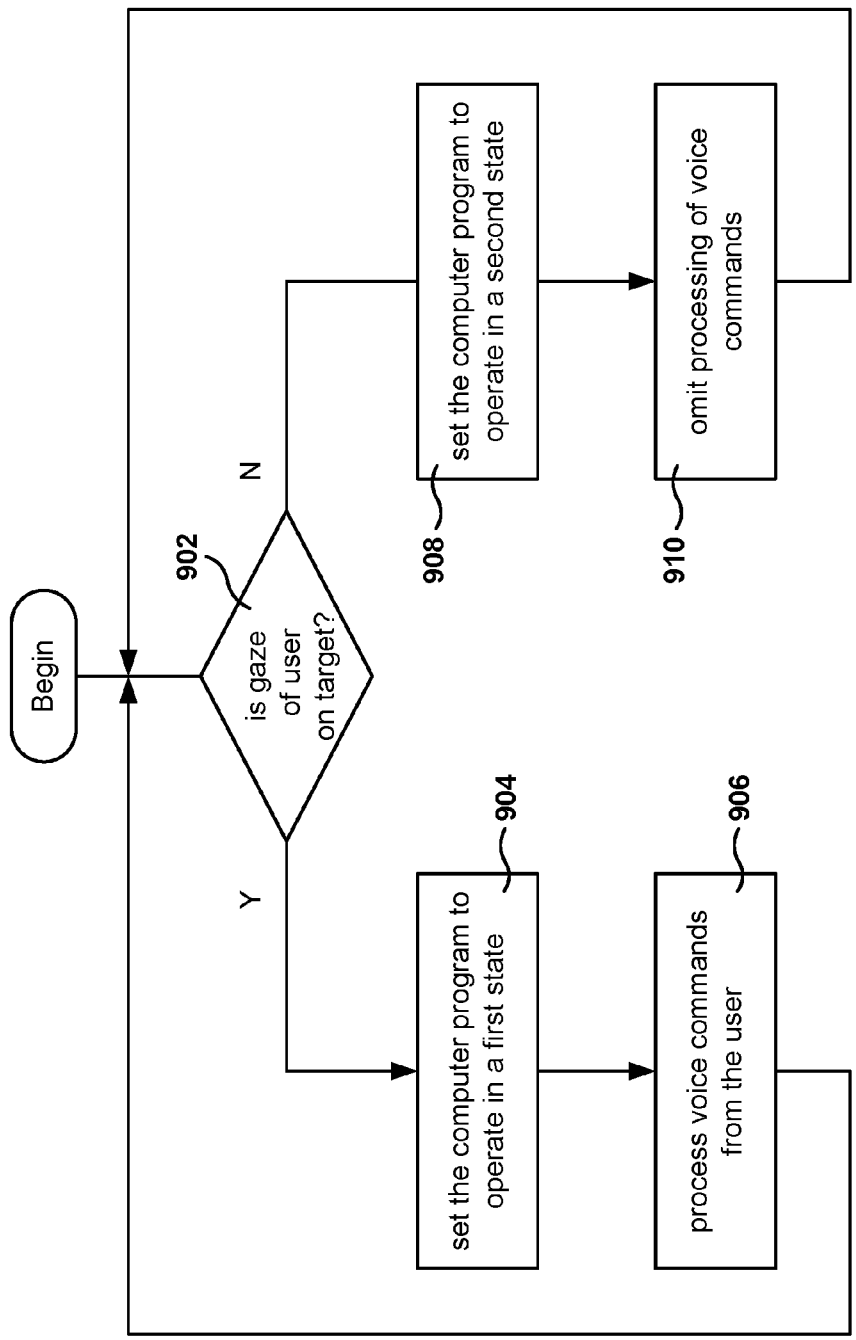
FIG. 9 shows a flowchart illustrating an algorithm for interfacing with a user, according to one embodiment of the invention.

FIG. 9 shows a flowchart illustrating an algorithm for interfacing with a user, according to one embodiment of the invention. In operation 902, a test is made to determine if the gaze of the user is on the target. If the gaze of the user is on the target, the method proceeds to operation 904, or to operation 908 if the gaze is not on the target. In one embodiment, the target is selected from a group consisting of a display, a computing device, a camera, a character in the display, or an object in the display.

In operation 904, the computer program is set to operate in a first state that enables the processing of voice commands 906 from the user. In operation 908, the computer program is set to operate in a second state where the processing of voice commands is omitted 910.

Figure 10:
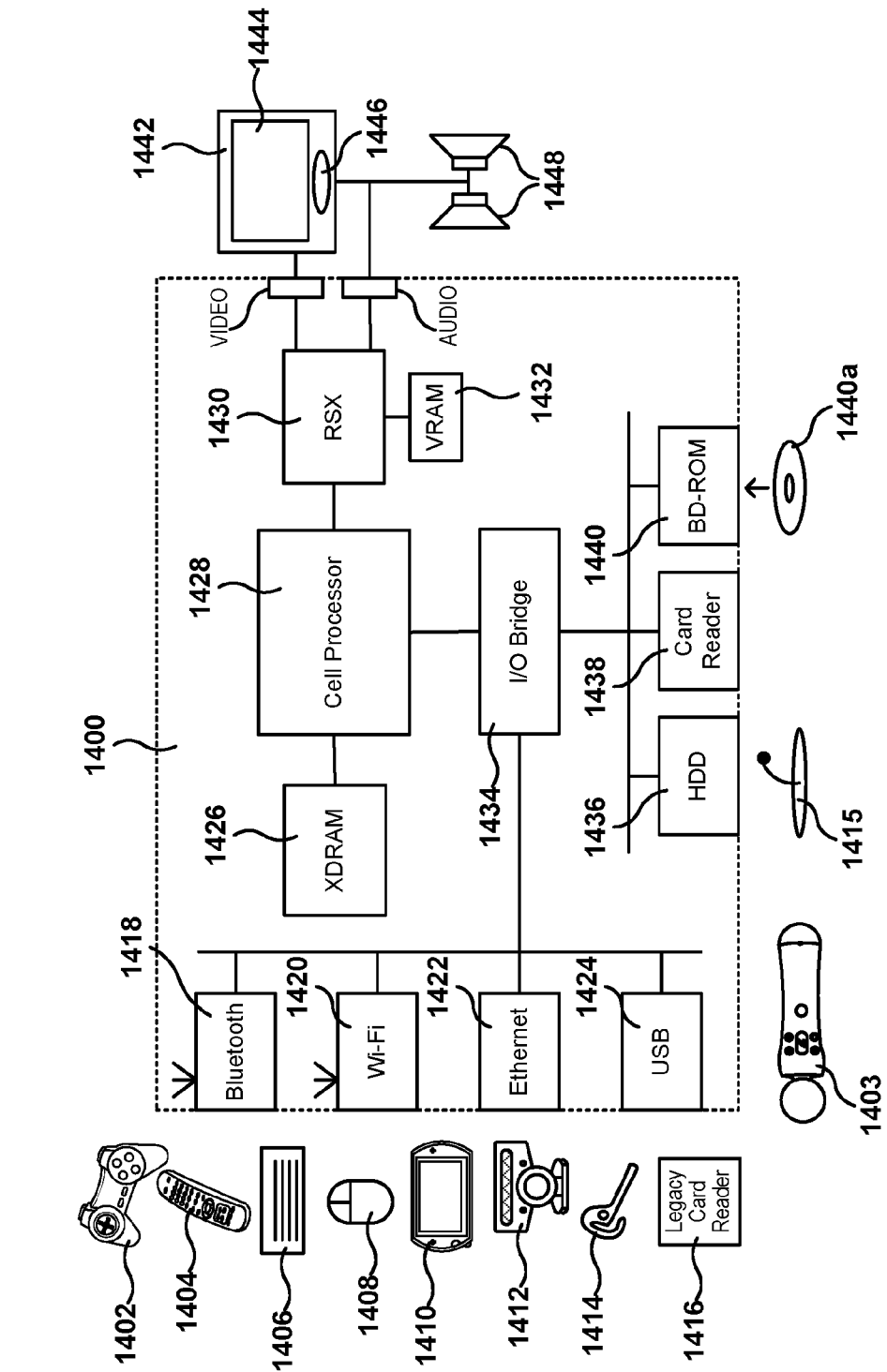
FIG. 10 illustrates hardware and user interfaces that may be used to implement embodiments of the invention.

FIG. 10 illustrates hardware and user interfaces that may be used to implement embodiments of the invention. FIG. 10 schematically illustrates the overall system architecture of the Sony® Playstation 3® entertainment device. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony PSP® entertainment device; a video camera such as a PlayStation®Eye Camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1416 may be connected to the system unit via a USB port 1424, enabling the reading of memory cards of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and Playstation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit (RSX) 1430, through audio and video connectors to a display and sound output device 1442 such as a monitor or television set having a display 1444 and one or more loudspeakers 1446, or stand-alone speakers 1448. In one embodiment, voice and gaze inputs are utilized to play sound toward specific audio speakers according to the POG of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for interfacing with a computer program executing on a computing device, the method comprising:
    presenting a character on a display;
    determining if a point of gaze (POG) of a user is on the display;
    setting the character to present a first behavior when the POG is determined to be on the display, wherein the first behavior provides an impression of awareness of the user by the character, wherein a gaze of the character is maintained toward the user and tracked while the POG of the user is on the character, wherein the tracking causes the character to show motion that enables the maintaining of the gaze of the character toward the user;
    setting the character to present a second behavior when the POG is determined to be away from the display, wherein the second behavior provides an impression that the character is not interacting with the user, wherein the gaze of the character is not tracked while the POG of the user is away from the character, wherein the computer program processes voice commands from the user when operating in the first behavior, and wherein the computer program omits processing of voice commands when operating in the second behavior; and
    setting the character to operate in a third behavior when multiple users are detected, wherein the character, when operating in the third behavior, performs a validation operation after receiving a voice command, the validation operation including asking a question to the user to validate the voice command, wherein the validation operation is not performed when the voice command is received while the character is presenting the first behavior.

2. The method as recited in claim 1, wherein the computer program is a game executing on a game console, and wherein the voice command is an input for the game to perform an operation related to the character.

3. The method as recited in claim 1, wherein determining if the POG of the user is directed towards the display further includes:
performing image analysis for a plurality of images of a video stream; and
detecting facial features of the user based on the image analysis.

4. The method as recited in claim 1, wherein determining if the POG of the user is directed towards the display further includes:
analyzing corneal reflection to determine a direction of the gaze of the user.

5. The method as recited in claim 1, wherein the method operations are performed by the computer program when executed by one or more processors, the computer program being embedded in a non-transitory computer-readable storage medium.

6. The method as recited in claim 1, further including:
identifying a plurality of gaze targets on the display, each gaze target corresponding to a menu selection;
detecting the POG on a first gaze target from the plurality of gaze targets;
highlighting on the display a first menu selection corresponding to the first gaze target to differentiate the first menu selection with respect to other menu selections, wherein the user utilizes gaze to select from the menu selections; and
processing voice commands to initiate an action for the first menu selection.

7. The method as recited in claim 1, wherein operating in the first behavior further includes:
processing controller inputs to perform corresponding actions on the character.

8. The method as recited in claim 1, wherein the first behavior further includes one or more of the character providing eye contact, or showing excitement, or smiling, or jumping, or providing verbal cues to the user.

9. The method as recited in claim 1, wherein the second behavior further includes the character acting in a passive way showing lack of enthusiasm and awareness of the user.

10. The method as recited in claim 1, further including:
tracking a location of a controller using captured images with a camera;
determining which user from a plurality of users in front of the display is holding the controller based on the captured images; and
determining the gaze of the user holding the controller.

11. A method for controlling interfacing reactions with game objects produced by a computer program and rendered on a display, comprising:
detecting presence of a user in a zone defined in front of an image capture device;
presenting a character on a display;
determining if a point of gaze (POG) of the user is on the character on the display;
setting the character to present a first behavior when the POG is on the character on the display, wherein the first behavior provides an impression of awareness of the user by the character, wherein a gaze of the character is maintained toward the user and tracked while the POG of the user is on the character, wherein the tracking causes the character to show motion that enables the maintaining of the gaze of the character toward the user, the first behavior including processing of user voice commands by the computer program to perform actions on the character;
setting the character to present a second behavior when the POG is away from the character, wherein the second behavior provides an impression that the character is not interacting with the user, wherein the gaze of the character is not tracked while the POG of the user is away from the character, the second behavior including an omission of processing of user voice commands by the computer program; and
setting the character to operate in a third behavior when multiple users are detected, wherein the character, when operating in the third behavior, performs a validation operation after receiving a voice command, the validation operation including asking a question to the user to validate the voice command, wherein the validation operation is not performed when the voice command is received while the character is presenting the first behavior.

12. The method as recited in claim 11, wherein determining if the POG is on the character further includes:
analyzing reflection from pupils of the user from an infrared light.

13. The method as recited in claim 11, wherein the first behavior further includes taking turns speaking to the user.

14. The method as recited in claim 11, further including:
tracking a location of a controller using captured images with a camera;
determining which user from a plurality of users in front of the display is holding the controller based on the captured images; and
determining the gaze of the user holding the controller.

15. The method as recited in claim 11, further including:
identifying a plurality of gaze targets on the display, each gaze target corresponding to a menu selection;
detecting the POG on a first gaze target from the plurality of gaze targets;
highlighting on the display a first menu selection corresponding to the first gaze target, wherein the user utilizes gaze to select from the menu selections; and
processing voice commands to initiate an action for the first menu selection.

16. An apparatus with a visual interface for capturing user input to a computer program executing on a computing device, the apparatus comprising:
a camera that captures images of a user situated in front of a display, the computer program presenting a character on the display;
a gaze detection module that determines if a point of gaze (POG) of a user is directed towards the character on the display based on the captured images, wherein the computer program sets the character to present a first behavior when the POG is on the character on the display, and wherein the computer program sets the character to present a second behavior when the gaze is determined to be away from the character on the display, wherein the first behavior provides an impression of awareness of the user by the character, wherein a gaze of the character is maintained toward the user and tracked while the POG of the user is on the character on the display, wherein the tracking causes the character to show motion that enables the maintaining of the gaze of the character toward the user, wherein the gaze of the character is not tracked while the POG of the user is away from the character on the display, wherein the second behavior provides an impression that the character is not interacting with the user, and wherein the computer program sets the character to operate in a third behavior when multiple users are detected; and a voice command processing module that receives voice commands from the user, wherein the computer program processes the voice commands from the user when operating in the first behavior to perform actions on the character, wherein the computer program omits processing of the voice commands when operating in the second behavior, and wherein the computer program performs a validation operation after receiving a voice command from the user when the character is operating in the third behavior, the validation operation including asking a question to the user to validate the voice command, wherein the validation operation is not performed when the voice command is received while the character is presenting the first behavior.

17. The apparatus as recited in claim 16, wherein the computer program tracks a location of a controller using the captured images, wherein the computer program determines which user from a plurality of users in front of the display is holding the controller based on the captured images, and wherein the gaze detection module determines the gaze of the user holding the controller.

18. The apparatus as recited in claim 16, wherein the voice command processing module is coupled to a microphone array and determines a direction of the voice commands, and wherein the gaze detection module focuses on the gaze of the user based on the direction of the voice commands.

19. The apparatus as recited in claim 16, wherein the gaze detection module performs a calibration operation to determine a location of the display.

* * * * *